United States Patent
Astarabadi et al.

(10) Patent No.: US 6,910,064 B1
(45) Date of Patent: Jun. 21, 2005

(54) SYSTEM OF DELIVERING CONTENT ON-LINE

(75) Inventors: Shaun Astarabadi, Laguna Niguel, CA (US); Glenn Swonk, Laguna Niguel, CA (US); Andrew McCloskey, Yorba Linda, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 771 days.

(21) Appl. No.: 09/666,235

(22) Filed: Sep. 21, 2000

Related U.S. Application Data

(63) Continuation-in-part of application No. 09/553,430, filed on Apr. 19, 2000, now Pat. No. 6,701,357.

(51) Int. Cl.⁷ ............................................. G06F 15/16
(52) U.S. Cl. ...................................... 709/203; 709/219
(58) Field of Search ................................. 709/203, 219, 709/229, 209, 223; 715/513; 382/100

(56) References Cited

U.S. PATENT DOCUMENTS

| | | | |
|---|---|---|---|
| 5,980,078 A | * 11/1999 | Krivoshein et al. ............ | 700/1 |
| 5,991,810 A | * 11/1999 | Shapiro et al. ............. | 709/229 |
| 6,119,932 A | * 9/2000 | Maloney et al. ............ | 235/380 |
| 6,133,847 A | * 10/2000 | Yang ..................... | 340/825.22 |
| 6,167,567 A | * 12/2000 | Chiles et al. ............... | 717/173 |
| 6,195,104 B1 | * 2/2001 | Lyons ........................ | 345/473 |
| 6,317,128 B1 | * 11/2001 | Harrison et al. ............ | 345/629 |
| 6,434,222 B1 | * 8/2002 | Shaffer et al. ........... | 379/88.13 |
| 6,473,097 B1 | * 10/2002 | Elliott ....................... | 345/733 |
| 6,486,892 B1 | * 11/2002 | Stern ......................... | 345/760 |
| 6,564,259 B1 | * 5/2003 | Baber et al. ................. | 709/223 |
| 6,684,212 B1 | * 1/2004 | Day et al. .................... | 707/10 |
| 6,701,357 B1 | * 3/2004 | Astarabadi et al. ......... | 709/220 |
| 6,757,723 B1 | * 6/2004 | O'Toole et al. ............. | 709/222 |
| 2002/0090114 A1 | * 7/2002 | Rhoads et al. .............. | 382/100 |
| 2002/0095569 A1 | * 7/2002 | Jerdonek .................... | 713/155 |
| 2003/0009758 A1 | * 1/2003 | Townsend et al. ............ | 725/39 |

FOREIGN PATENT DOCUMENTS

| JP | 8-289253 | * 11/1996 | ......... H04N/5/928 |
|---|---|---|---|

\* cited by examiner

*Primary Examiner*—Bunjob Jaroenchonwanit
(74) *Attorney, Agent, or Firm*—Pillsbury Winthrop Shaw Pittman LLP

(57) ABSTRACT

A system and method of providing digitized media content from a remote server through a data network is disclosed. A local content server at the premises of the subscriber hosts an agent process and includes a memory for storing the digitized content. The digitized content may be streamed on demand to client devices through the agent process for a subscription period. However, the subscriber is prevented from otherwise accessing the digitized content from the local server. Also, the digitized content delivered from the remote server to the local server is combined with encoded data identifying the subscriber.

16 Claims, 9 Drawing Sheets

SYSTEM OF DELIVERING CONTENT ON-LINE

This is a Continuation-in-part of U.S. patent application Ser. No. 09/553,430 filed on Apr. 19, 2000 now U.S. Pat. No. 6,701,357.

BACKGROUND

1. Field of the Invention

Embodiments described herein relate to services to provide media content. In particular, embodiments herein relate to providing media content in computer networks.

2. Related Art

Traditional methods of distributing media content such as movies or music have involved the sale or rental of portable media such as video cassettes, compact disks or magnetic tapes, etc. The evolution of data communication networks has expanded the possibilities by which media content may be delivered to consumers. This has reduced the need for the expensive procedure associated with of the distribution of portable media associated with maintaining retail facilities and an inventory of media content titles.

The use of data communication networks also allows the distribution of digitized content in standard formats (e.g., MPEG2 for video content) which permits a presentation of the content on customer equipment with minimal signal noise corrupting the presentation on the customer equipment. Unfortunately, once digitized content is delivered to the customer over a data communication network, the customer is typically able to copy and distribute the content using commonly available technology without authorization from the owner of the content. Accordingly, there is a need for systems and techniques to prevent and discourage customers from copying and distributing content delivered in a data communication network.

DETAILED DESCRIPTION

Embodiments of the present invention are directed to providing media content to subscribers in an on-line environment. A remote server may provide digitized media content to a subscriber's local server through a digital communication network for storage at a local memory. The local server is configured to stream the media content data to users at client devices. In one embodiment, the client devices may access the locally stored media content only through an agent process. In another embodiment, the remote server combines the digitized content with encoded data identifying the subscriber.

Figure 1:
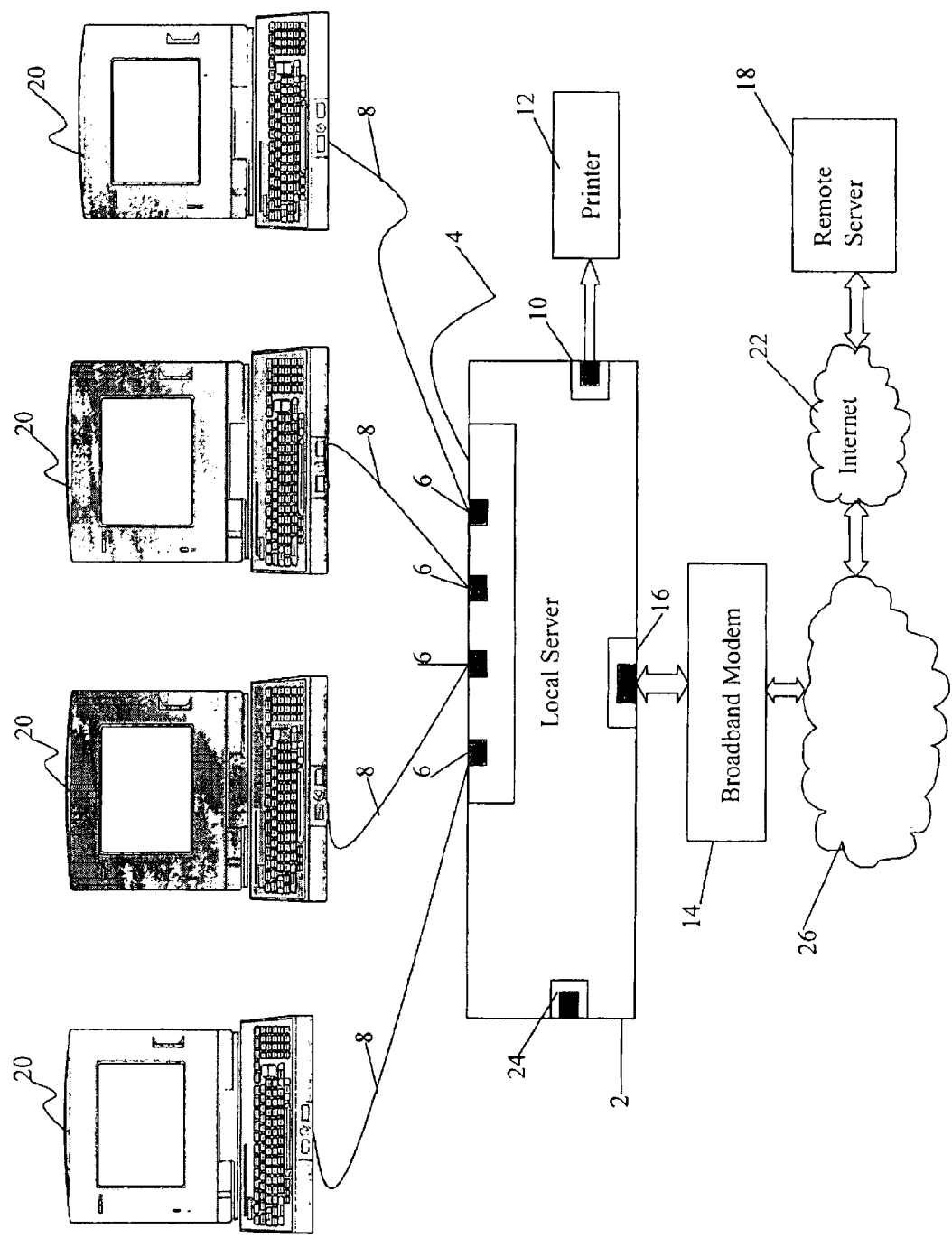
FIG. 1 shows a network topology including a local server according to an embodiment.

FIG. 1 shows a network topology including a local server 2 coupled to client computer workstations 20 through links 8 and an integrated hub 4. In the illustrated embodiment, the integrated hub provides a plurality of Ethernet connections 6, each Ethernet connection 6 being adapted to be coupled to a distinct computer workstation 20 through a corresponding data link 8. The local server 2 also includes a parallel port 10 coupled to a parallel port printer 12 and an Ethernet port 16. The Ethernet port 16 may be coupled to a broadband data source 26 such as a cable service or digital subscriber line (DSL) service through a compatible broadband modem 14 Alternatively, the port 16 may be coupled to other broadband data sources such as broadband satellite or terrestrial wireless communication services. In yet another embodiment, the port 16 is coupled to a local area network (LAN) or wide area network (WAN) as part of a larger private network.

The local server 2 may implement a firewall for monitoring data traffic between the data source 26 and the client complete workstations 20. In the embodiment in which the local server 2 is part of a larger private network such as a LAN or WAN, such a firewall may be provided at a gateway which transports data between a public data communication network and the private network.

In the illustrated embodiment, a remote server 18 may communicate with the local server 2 through a public data communication network such as the Internet 22. Also, the local server 2 includes a dial-up modem 24 to enable point to point communication with a remote mobile client user.

Each of the client computer workstations 20 may have a keyboard, display, and pointer device such as a mouse or track ball. The client computer workstation may also host an operating system which supports a graphical user interface (GUI) such as Windows 98, Windows 2000 or Windows NT 4.0 sold by Microsoft. Accordingly, the client computer workstations 20 include sufficient CPU and random access memory (RAM) resources to support the hosted operating system. Additionally, the computer workstations 20 may include a network card and corresponding Ethernet port for communicating with the local server 2 through the links 8. The client computer workstations 20 may also include a memory drive for receiving a removable memory medium such as a CD ROM drive or floppy disk drive in addition to a hard drive with a fixed memory. The communication link 8 coupling the client computer workstations 20 to the hub 4 may be an Ethernet cable or a wireless link coupling the Ethernet port of the client computer workstation 20 to a corresponding Ethernet port 6 on the hub 4. Such a wireless link may be compliant with the Bluetooth protocol or other known wireless communications format suitable for supporting bi-directional communication in a local environment.

Figure 2:
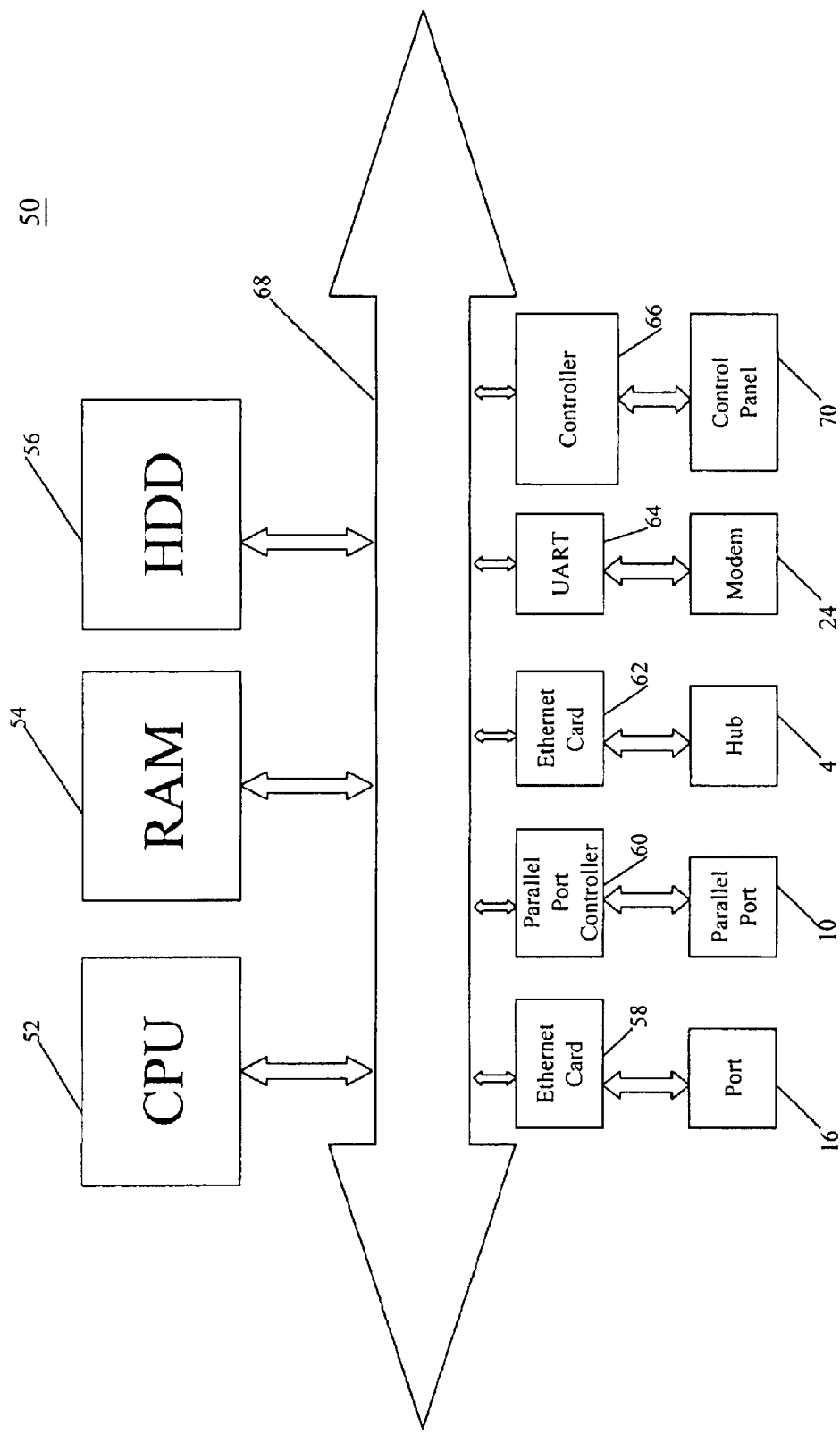
FIG. 2 shows a schematic diagram illustrating the hardware architecture of the local server of FIG. 1 according to an embodiment.

FIG. 2 shows a schematic diagram illustrating the architecture of 50 of the local server 2 according to an embodiment. A central bus 68 is coupled to a CPU 52, RAM 54, and hard disk drive (HDD) 56. The CPU 52 may be a 200 megahertz Celeron processor sold by Intel or other compatible microprocessors sold by other manufacturers such as Advanced Micro Devices (AMD). The architecture 50 may host a version of the Linux operating system or other suitable operating system which supports a communication protocol between the local server 2 and the client computer workstations 20, and between the local server 2 and the data source 16 (FIG. 1). Such communication protocols may include, for example, TCP/IP and the hypertext transfer protocol (HTTP). The architecture 50 also includes several communication devices coupled to the bus 68 including an Ethernet card 58 (for enabling communication with the Ethernet port 16), a parallel port controller 60 (for enabling communication with the printer 12 through the parallel port 10), an Ethernet card 62 (for communication between the hub 4 and the client computer workstations 20), a universal asynchronous receiver/transmitter (UART) 64 (enabling point to point communication through the modem 24). The architecture 50 may be provided in a chassis within a single form factor enclosure as shown in the local server 2 of FIG. 1. The hub 4 may allocate network addresses to the client computer workstations 20 according to a dynamic host control protocol (DHCP) or may allocate such network addresses statically. The Ethernet port 16 may be assigned a network address from the data source 16 either statically or according to the DHCP.

The architecture 50 may include a control panel 70 which is external to the chassis enclosure of the local server 2 to be accessible by an operator or system administrator. The control panel 70 may include, among other things, an LCD display and selection buttons (not shown) which enable the operating system administrator to request specific status information be displayed on the LCD display. A controller 66 enables communication from the selection buttons to the processing hardware and from the processing hardware to the LCD display for showing the requested status information.

Figure 3A:
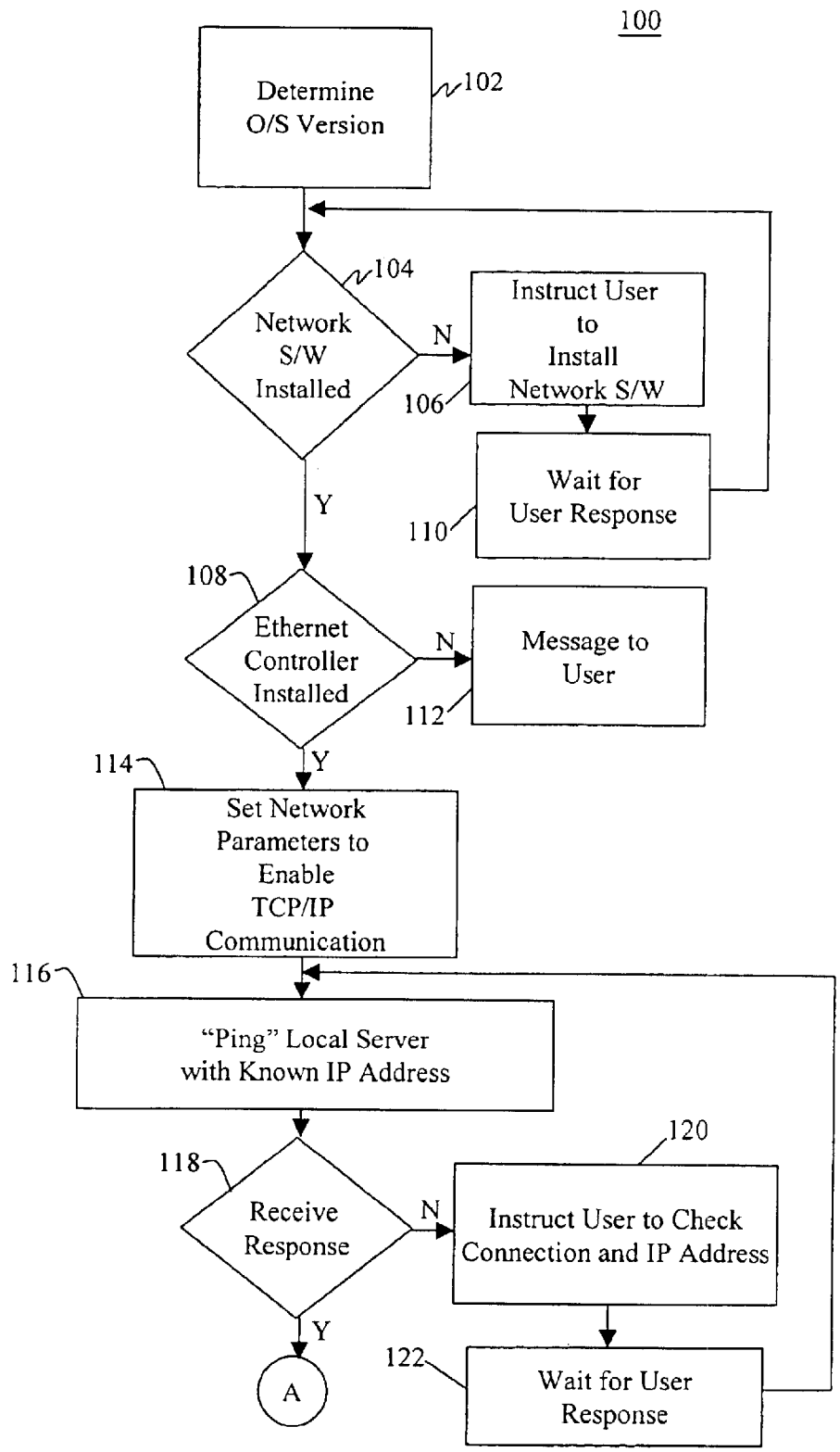
FIGS. 3A, 3B and 3C show a functional flow diagram of a process for establishing a communication protocol between the local server of FIG. 1 and one or more client computer workstations in a private network according to an embodiment.
Figure 3B:
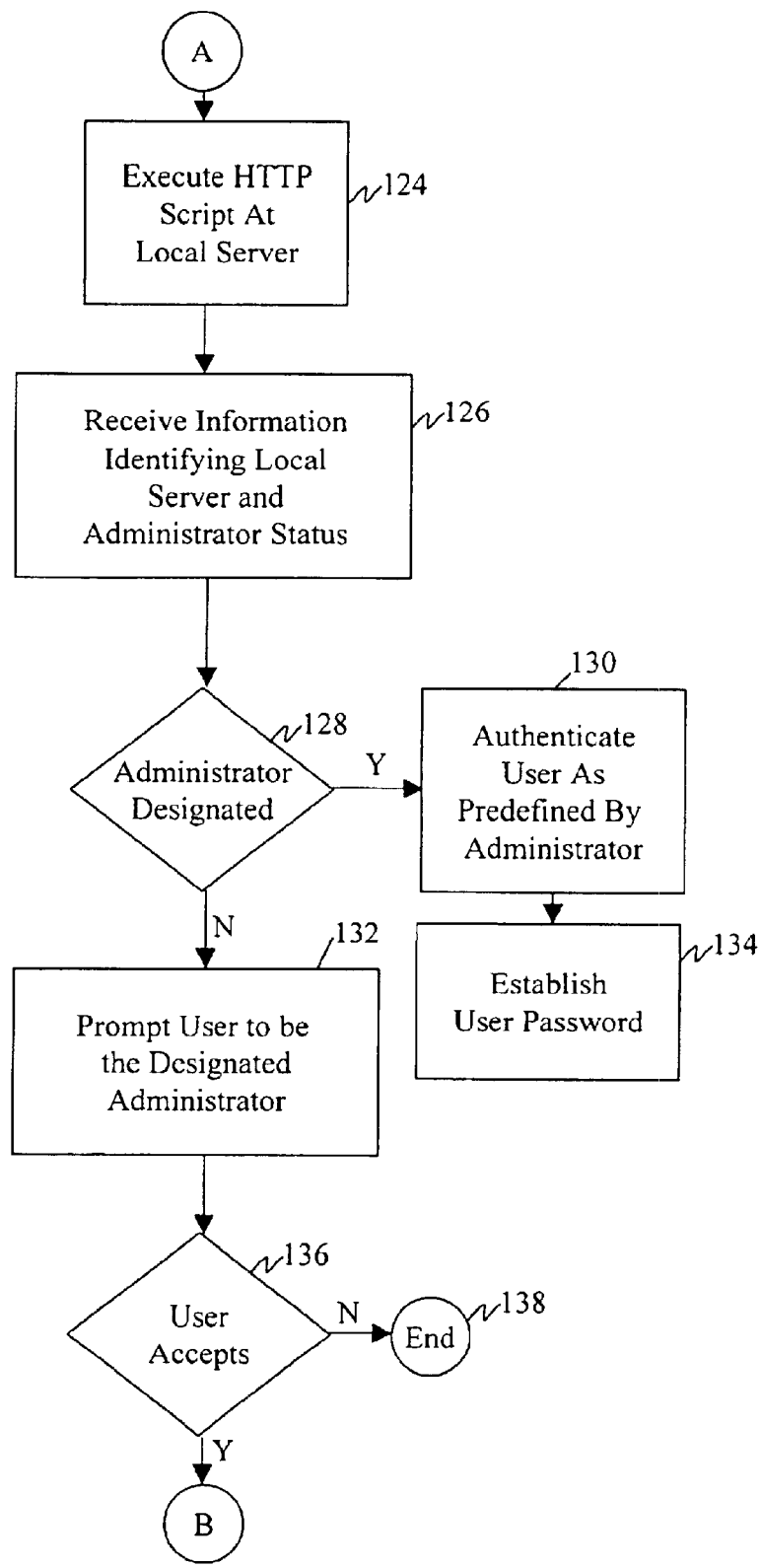
Figure 3C:
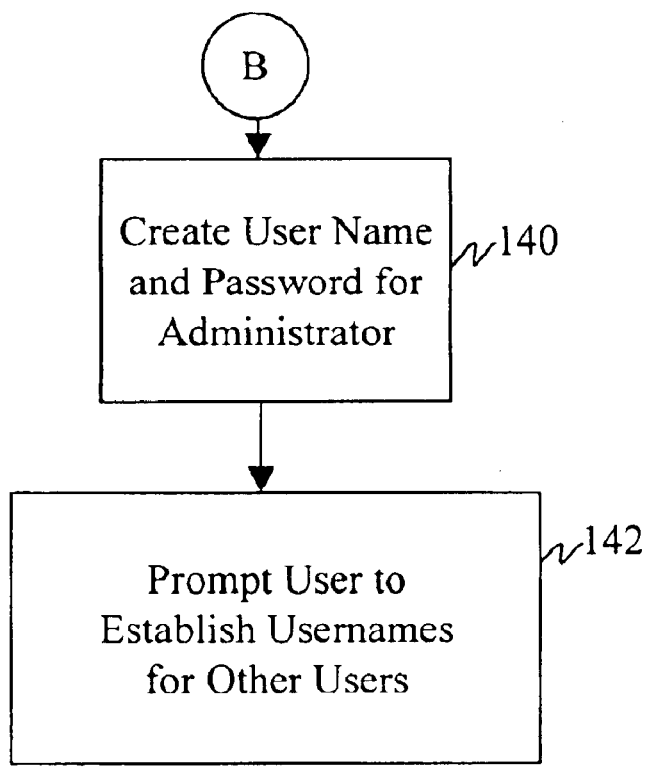

According to an embodiment of the present invention, a removable computer readable medium such as a CD ROM or floppy disk is inserted into a removable medium drive of the client computer workstations 20 to establish a communication protocol between the client computer workstation 20 and the local server 2. FIGS. 3A through 3C illustrate a process of executing a procedure stored on the computer readable medium to establish communication between a client computer workstation 20 and the server 2 according to an embodiment. Step 102 determines a particular operating system residing on the client computer workstation 20. For example, the operating system may be any one of several versions of Microsoft windows such as Windows 98, Windows 2000 and Windows NT 4.0. The operating system may be a version of any one of several other operating systems which support a GUI on the client computer workstations such as versions of the Macintosh operating system sold by Apple Computer or OS2 sold by IBM. Also, the operating system may also be versions of Linux or DOS.

Based upon knowledge of the particular operating system version, step 104 can determine whether network communication enabling software, such as software drivers for an Ethernet card, have been installed on the hard drive of the client computer workstation 20. If the network software is not installed, step 106 provides a message to the user instructing installation of the network software by, for example, instructing the user to install the network software from the operating system CD provided by the operating system manufacturer. Step 110 waits for a response from the user indicating that such network software has been installed, and step 104 is repeated to determine whether the network software has been installed.

Following the determination that the network software has been installed, step 108 determines whether an Ethernet controller card has been installed. This is accomplished by, for example, polling the software drivers for the Ethernet controller. If no Ethernet controller is detected, step 112 provides a message to the user that no Ethernet controller has been installed. If an Ethernet controller is installed, step 114 sets network parameters in the network software driver stack to enable TCP/IP communications through the Ethernet port. Step 116 then "pings" the hub 4 at the local server 2 with a known IP address. In the illustrated embodiment, the local server 2 is assigned a known IP address such as "192.168.1.1" which is indicated in the program for configuring the client computer workstation 20 for communication with the local server 2 on the removable medium. If the client computer workstation 20 does not receive a response from the local server 2 at step 118, step 120 displays a message to the user to check the physical connection between the Ethernet port of the client computer workstation 20 and the hub 4, and check the IP address of the local server 2. In the illustrated embodiment, the address of the local server 2 may be changed by a remote administrator via an agent as discussed below, or by physical tampering with the local server 2. The control panel 70 (FIG. 2) may receive input selections from a user having physical access to the local server 2 for requesting display of the assigned network address of the local server 2 on the LCD display of the control panel 70. This may be accomplished by, for example, associating a particular interrupt routine responding to signals from the controller 66 to retrieve the network address of the local server 2 from memory and display on the LCD display. Accordingly, the user may compare the network address provided on the LCD display with the network address displayed at the client computer workstation 20 and input the correct network address of the local server 2 if there is no match. Step 122 waits for a user to respond to the message at step 120 to attempt to ping the server again at step 116.

Upon receipt of a response to the ping from a local server 2, step 124 executes a script at the local server 2 to establish communication at the HTTP layer. Execution of the script results in transmission of information identifying the local server and administrative status which is received by the client computer workstation 20 at step 126. This information may include, among other things, the manufacturer of the local server 2, model number, version number, and version of the operating system at the local server 2. This information received at step 126 may also include administrator status information indicating whether a client user has been designated as the network administrator, and any pre-authorized client users.

If step 128 determines that an administrator has been designated, step 130 initiates an authentication process for the user by displaying a query at the client computer workstation 20 for a user name. If the user inputs a user name included in a list of pre-allocated user names received at step 126, step 134 initializes a process to establish a user's password by, for example, asking the user to select a password of appropriate character length.

If step 128 determines that a network administrator has not been designated, step 132 displays a prompt to the user asking the user if the user would like to be the designated administrator. If the user does not accept, the process terminates at step 138. Alternatively, if the user accepts, step 140 prompts the user to create a user name and password for the administrator and step 142 prompts the user to establish user names for other users for future use (e.g., at steps 130 and 134 for authenticating non-administrative users and their passwords).

In the illustrated embodiment, the designated administrator has certain privileges to the exclusion of other client users of the local server 2. For example, the designated administrator may have privileges to add or delete user accounts, retrieve password information for other client users and allocate memory resources on the HDD 56 (FIG. 2). The manufacturer of the local server 2 may maintain a remote server 18 shown in FIG. 1, which may communicate with the local server 2 through the Internet 22. Data source 26 may allocate a worldwide web address to the Ethernet port 16. According to an embodiment, the designated administrator has the ability to delegate or handoff administrative privileges to a remote server 18 through the Internet. This may be implemented in the form of an agent process residing at the local server 2 which is controlled by the administrator at the remote server 18 upon assuming administrative privileges. The handoff of administrative privileges may be invoked by a message received from the local administrator through the public data communications network or by a telephone call. The administrator at the remote server 18 may have additional privileges for access to operating system or system configuration files to diagnosis malfunction and take appropriate corrective action.

The HDD 56 may be used to store centralized files for a small business or enterprise which is essential to the functioning of the small business or enterprise. It, therefore, may be desirable to periodically backup the files of the HDD 56 to another memory device such as a backup tape drive or CD ROM press (not shown) coupled to the local server 2. In an alternative embodiment, the backup device may be attached to one of the client computer workstations 20 or at a remote location. An embodiment of the present invention is directed to receiving an input at the control panel 70 (e.g., a predetermined or menu driven selection of buttons or keystrokes) to initiate a backup of the entire image, or portions thereof, stored on the HDD 56. For example, input interpreted at the controller 66 may initiate or interrupt to execute a routine at CPU 52 to copy files from HDD 56 to the aforementioned backup memory device coupled to the local server 2. In an alternative embodiment, the backup routine may include transmitting the files to be backed up from the HDD 56 to the remote server 18 via the Internet 22. The remote server 18 may provide such a service to the operator or local server 2 on a subscription basis. The remote server 18 may then maintain backup files for the operator or local server 2 which are available upon request.

Figure 4:
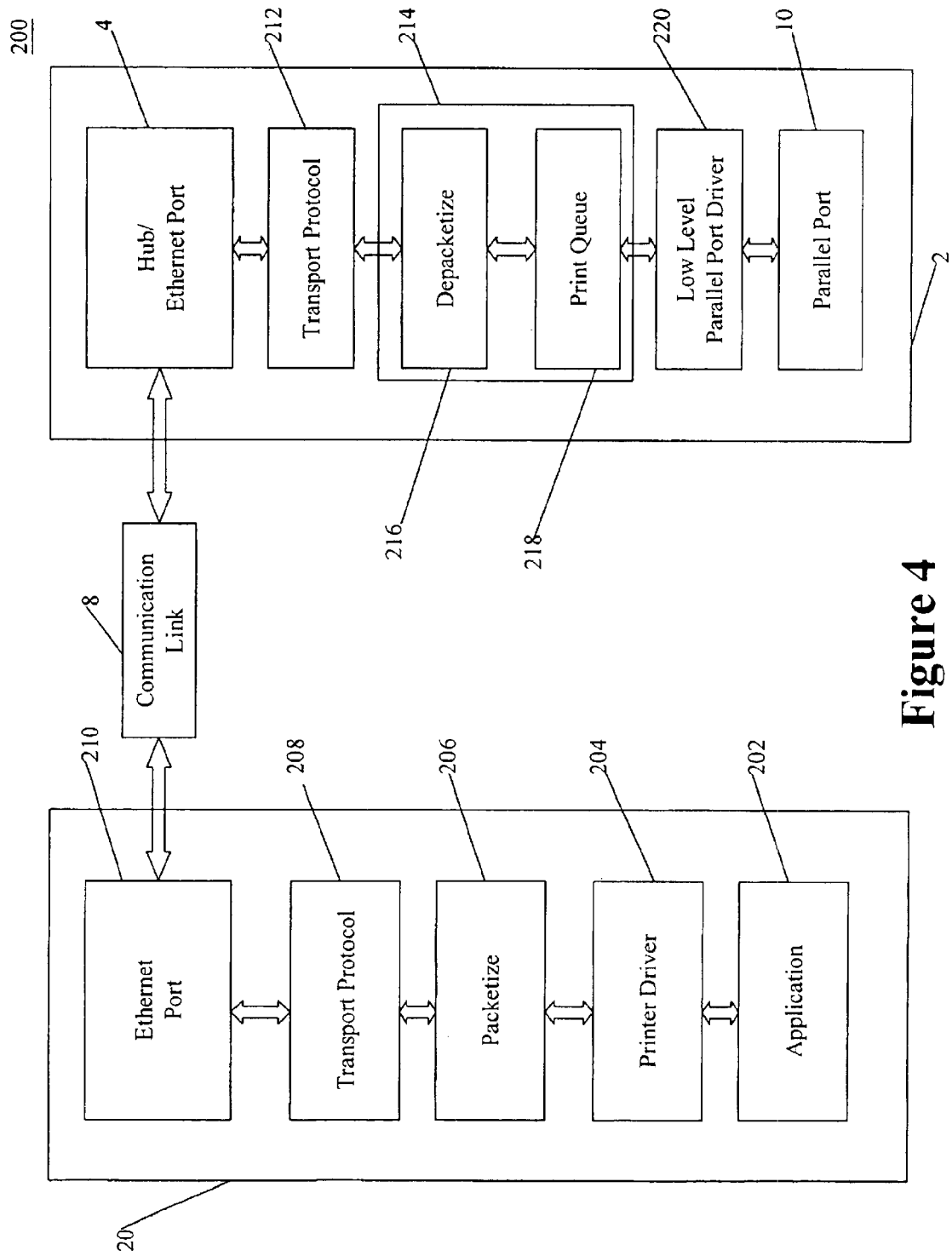
FIG. 4 shows a diagram illustrating a process of transmitting print jobs from a client computer workstation to a parallel port printer through a print queue at an embodiment of the local server shown in FIG. 2.

Another embodiment of the present invention is directed to implementing a print server for the printer 12 at the local server 2 which enables the client computer workstations 20 to share the printer 12 (FIG. 1). FIG. 4 illustrates an implementation of such a system which enables sharing of the printer 12. Here, the user creates a document for printing at an application 202 and request that the document be printed. A printer driver 204 creates a print job from the document received from the application 202. The print job created at the printer driver provides printer commands and image data in a suitable form to be received at the printer 12. For example, the created print job may include image data and printer commands interpretable by the printer 12 to accurately reproduce the document created at the application 202. The print job may be a form suitable for transmitting to a low level parallel port driver associated with a port coupled to a parallel port printer. In the illustrated embodiment, the print job is packetized and provided to a transport protocol driver 208 to be transmitted to the local server 2 through an Ethernet port 210 and communication link 8.

The packetized print job is received at the hub/Ethernet port 4 and provided to a print server 214 via an IP server 212. Print jobs received from the IP server 212 are depacketized and reassembled at a depacketize routine 216. The reassembled print jobs are suitable for transmitting to the printer 12 through a low-level parallel port driver. A print queue 218 stores and sequentially releases print jobs to the parallel port printer 12 through the low level parallel port driver 220 and parallel port 10. In an alternative embodiment, the print jobs may be depacketized as they are released from the print queue 218.

The print server 214 at the local server 2 enables the local server 2 to be used with any parallel port printer without having the software driver of the parallel port printer. Accordingly, no modifications are required to the local server 2 when a new parallel port printer (i.e., having a different print job format) is used. The client computer workstations 20 include the printer driver 204 which is compatible with the particular parallel port printer 12 coupled to the parallel port 10. Therefore, when a different parallel port printer 12 is coupled to the parallel port 10, a printer driver 204 which is compatible with the new printer may be enabled or installed at the client computer workstations 20.

Another embodiment of the present invention is directed to displaying information regarding the status of the local server 2 on the display portion of the client computer workstation 20. The operating system on a client computer workstation 20 may have logic for generating a particular image in the display in response to an absence of processing activity at the CPU of the client computer workstation 20. For example, versions of the Windows Operating System include logic for a "screen saver" which generates an image to be displayed after a prolonged period of an idle state at the CPU. In the illustrated embodiment, such screen saver logic may include a routine for transmitting a polling signal to the local server 2 for status information including, for example, the number of users currently actively logged into the system, available memory on the HDD 56, date of the last system backup, CPU utilization, and other such status information. Thus, the screen saver routine periodically transmits a polling signal down the network stack to be transmitted through the communication link 8 and received at the IP server of the local server 2. A status routine at the local server 2 responds to the polling signal by retrieving the status information from designated memory locations in the RAM 54 and transmitting information which is representative of the retrieved status information back to the requesting client computer workstation 20. The screen saver routine at the client computer workstation 20 interprets the received information and generates an alphanumeric display on the display screen to show the status information to the user.

According to an embodiment, the controller 66 associated with the control panel 70 may include logic for performing power up and power down procedures for the local server 2 according to a pre-specified schedule (FIG. 2). According to an embodiment, the CPU 52 resides on a motherboard. Here, the controller 66 maintains an internal clock and receives power from a power supply (not shown) in the local server 2 independently of the power source to the motherboard, RAM 54 and HDD 56. Logic in the controller 66 allows a system operator to specify a schedule for powering up and powering down the local server 2 (e.g., by specifying a time and date when the local server 2 is to be powered down and a time and date when the local server 2 is to be powered up).

To initiate a procedure to power down the local server 2, the controller 66 may transmit an interrupt signal to initiate the execution of a driver for shutting down the operating system. The controller 66 may then monitor the progress of the shut down procedure to detect completion by, for example, detecting a signal from the driver indicating completion of the shut down procedure or detecting an absence of a signal from the driver indicating that the shut down procedure is still in progress.

Upon determining that the shut down procedure has completed, the controller 66 may transmit a signal to the power supply to remove power from other select devices of the local server 2 such as the motherboard, the RAM 54 and the HDD 56. In an embodiment in which the power supply is digitally controlled, the controller 66 may transmit a power down signal to the power supply on a bus (not shown) to remove power from the select devices. Alternatively, the controller 66 may transmit a signal to a relay switch which causes the removal of power to the select devices. To restore power to the select devices of the local server 2, the controller 66 transmits a signal to the power supply to restore power to the select devices. Upon receipt of power at the motherboard, the local server 2 may re-boot or return to a state at which the local server 2 was previously shut down.

Other embodiments of the present invention are directed to serving content to the client computer workstations 20 from the remote server 18. For example, a user at a client computer workstation 20 may request that the remote server 18 provide contents such as video and/or audio content to be stored at the HDD 56 in digital form, and then streamed to any client computer workstation 20 on demand for presentation on demand.

In one embodiment, an agent process (not shown) of the remote server 18 resides on the local server 2. A request from the user at the client computer workstation for content at the remote server 18 initiates the agent process. The agent process receives the digitized content from the remote server 18 and installs the digitized contents on the HDD 56. As part of a subscription agreement, the digitized content may be available for presentation to any one of the client computer workstations 20 for a specified subscription period. When the user requests presentation of the content at a client computer workstation 20, the agent process responds by retrieving the digitized content from the HDD 56 and streaming the content to the client computer workstation 20 for the display of the content on the display on the client computer workstation 20 (in the case of video content) or playing the content through speakers (not shown) at the client computer workstation 20 (in the case of audio content).

According to an embodiment, the operating system on the local server 2 partitions the HDD 56 such that at least one dedicated portion of the HDD 56 is accessible by the agent process and is not accessible by any of the users at the client computer workstation 20. This prevents the users from accessing the dedicated portion of the HDD 56 for the purpose of copying the digitized content in violation of the subscription agreement. In another embodiment, the agent process removes the digitized content from the dedicated partition upon expiration of the subscription period. This prevents users from presenting the content at the client computer workstations 20 beyond the subscription period.

According to an embodiment, the remote server 18 provides requested digitized content to the agent process having encoded information identifying the subscriber. The digitized content which is then on the HDD 56 in the dedicated partition includes encoded information identifying the subscriber. Therefore, to the extent that a subscriber may copy and/or distribute the delivered content without authorization, the distributed copies will retain the encoded information identifying the subscriber.

Figure 5:
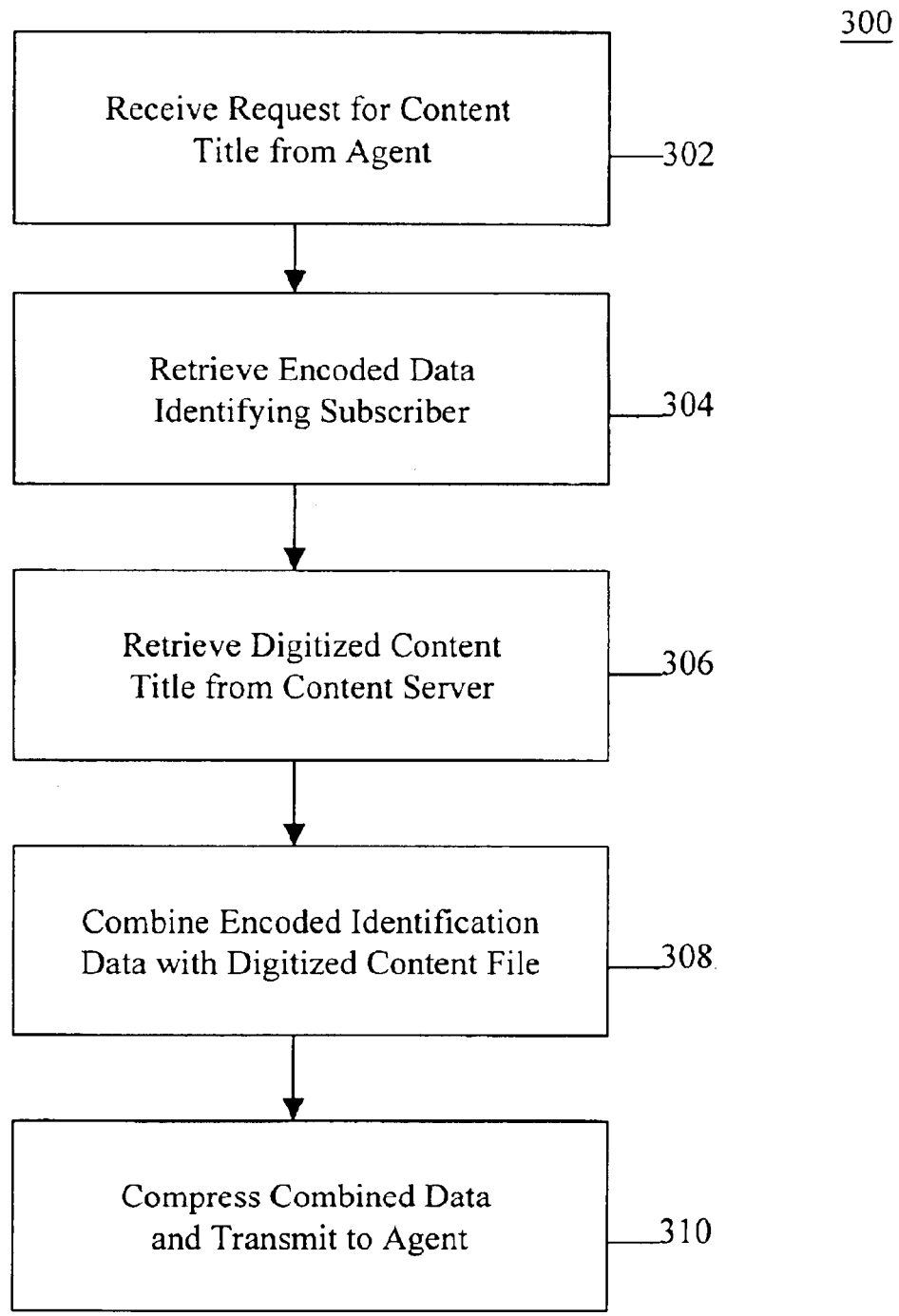
FIG. 5 shows a flow diagram illustrating a process of combining digitized content with an encoded signal identifying a subscribing party according to an embodiment.

FIG. 5 illustrates a process by which the remote server 18 provides digitized content to the agent process at the local sever 2 in response to a user request. At step 302, the remote server 18 receives a request for a particular content title from the agent process. In addition to identifying the particular requested title, the request also includes information from which the identity of the subscriber may be obtained. For example, the request may include information identifying the particular local server 2 which is cross-referenced with the subscriber's identity. The request may also specifically identify the subscriber by a subscriber's name or by an account number.

At step 304 the remote server 18 retrieves encoded digital data identifying the subscriber. At step 306 the remote server 18 retrieves the digitized content title from a content server as identified in the received request. Step 308 combines the encoded identification data retrieved at step 304 with the digitized content title retrieved at step 306 to provide modified digitized content. The combined data is then compressed and transmitted back to the agent process at step 310 to be stored on the HDD 56. The digitized content stored on the HDD 56, therefore, includes the encoded data identifying the subscriber.

Figure 6:
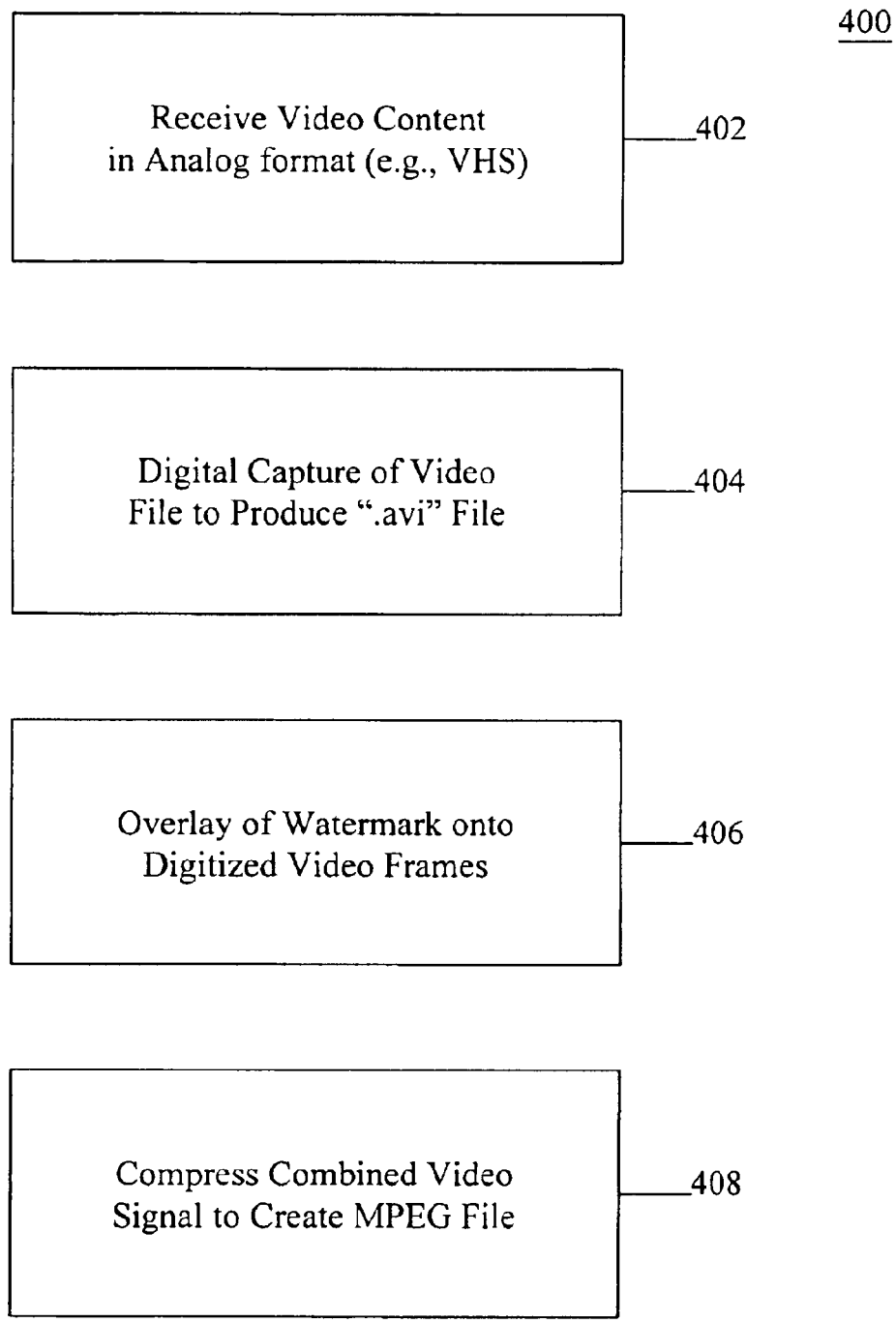
FIG. 6 shows a flow diagram illustrating an embodiment of the process of FIG. 5 in which identification data is inserted into video frames of digitized content.

FIG. 6 illustrates an embodiment of processing of steps 304, 306 and 308 for a digitized content title in a video format. In the illustrated embodiment, a "watermark" is inserted into the video frames which are displayed to the users when streamed to the client computer workstation 20 for presentation. The watermark may include, among other things, the name of the subscriber, an account number or an icon identifying the subscriber. Step 402 receives video content in an analog format such as VHS. In an alternative embodiment, the video content may be stored in a digital compressed format such as MPEG 2. In the embodiment in which video content is received in an analog format, step 404 digitally captures the video frames to provide an ".avi" file for the video frames. In the embodiment in which video titles are retrieved in a compressed digital format, step 404 decompresses the data to extract the digitized video frames. Step 406 inserts the watermark into the digitized video frames to provide a combined video signal using video editing techniques known to those of ordinary skill in the art. Step 408 then compresses the combined video signal into a compressed format such as MPEG 2 for transmission to the agent at the local server 2.

While the embodiments illustrated above are directed to inserting encoded information into the digitized content which to be then stored in the dedicated partition of HDD 56, it should be understood that the embodiments illustrated above with reference to FIGS. 5 and 6 may be applied to digital content delivery systems generally. For example, systems for providing video on demand to subscribers through a cable television set top box may also employ the illustrated technique for inserting a watermark. Here, a cable television head-end may receive a request for a video title from a subscriber. Based upon the identity of the subscriber, the head-end inserts a watermark into the video frames transmitted to the subscriber. In an embodiment which the video on demand system transmits digitally encoded audio and video data, the head-end transmits the video data after the watermark is inserted and any following digital compression and packetization. In an embodiment which the head-end provides the video on demand in an analog rasterized video signal, the head-end generates an analog video signal based upon the digitized video frames including the combined digital watermark. The modified digitized video frames may then be converted back to an analog rasterized video signal for transmission to the subscriber.

The insertion of encoded data identifying a subscriber may also be used in content delivered on removable memory devices such as video tapes, compact disks, and other removable media capable of storing a content title in a digital or analog format. For example, a subscriber may order a content title which is to be prepared on the removable medium. The content title is first provided in a digital format, and then combined with the encoded data representative of the identity of the customer. Such an insertion of the encoded data identifying the customer may discourage the customer from unauthorized copying and distribution of the content.

Figure 7:
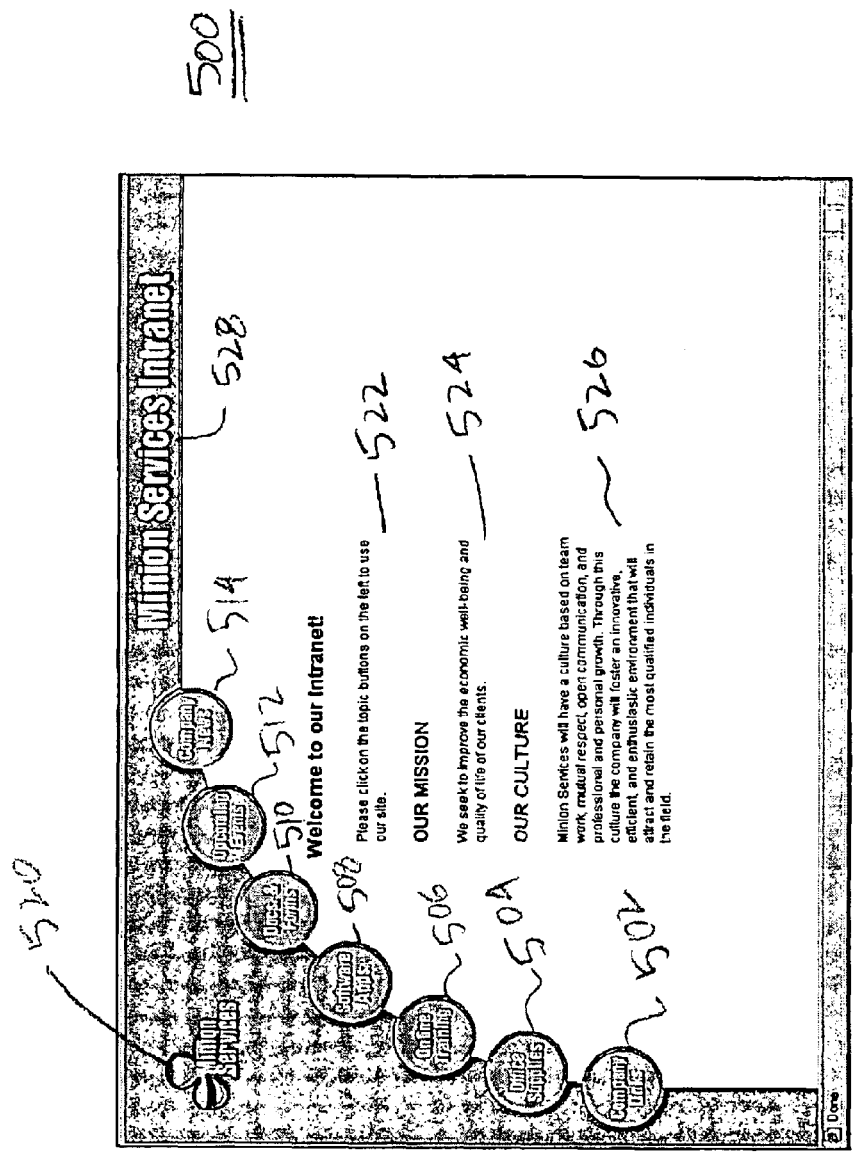
FIG. 7 shows a home page for a turnkey Intranet according to an embodiment of the present invention.

In one embodiment of the present invention, the local server may include a factory loaded turnkey Intranet which is accessible at network browsers at the client workstations 20. FIG. 7 shows a home page 500 for an embodiment of the turnkey Intranet which may appear at a client computer workstation 20 when an instance of the network browser is launched at the client computer workstation 20. The home page 500 may be generated from an HTML document and includes fields 520, 522, 524, 526 and 528. Fields 520, 522, 524, 526 and 528 may be provided as blank fields to be custom tailored according to the functions of an organization using the local server 2. Authority to modify these fields may be restricted to certain users such as the system administrator.

The home page 500 also includes selectable icons 502 through 514. Each of the selectable icons 502 through 514 is associated with a script which is executed upon selection of the icon. The scripts for the icons 502, 510, 512 and 514 may link the network browser to HTML pages hosted at the local server 2 which are maintained by the enterprise. Each of these local HTML pages may be maintained by one or more designated users to provide internal information resources to the users. Selection of the icon 510 may provide a page which allows the downloading of one or more internal documents or forms. Selection of icons 512 or 514 may provide pages containing information which is updated internally on a periodic basis.

Each script for the icons 504 through 508 provides a link to a universal resource locator (URL) of a server process hosted at or in conjunction with the remote server 18. These scripts may request a page from the remote server 18. The operator of the remote server 18 may update the pages associated with the icons periodically to ensure that the information and links at each URL is current. Selection of the icon 504 may execute a script to request a page from the remote server 18 with links to one or more websites of third party vendors. The remote server 18 may host web based software applications for use by client users at the client computer workstations 20 for a fee. Selection of the icon 508 may execute a script to link the network browser to a server hosted at the remote server 18 to provide the web based applications. The remote server 18 may respond by, for example, providing pages with a menu of selectable options and a form for account authentication.

Selection of the icon 506 links the network browser to processes at the remote server 18 for dispensing digitized content as illustrated above with reference to FIGS. 5 and 6. The remote server 18 may provide a page with a form for receiving inputs from the network browser for account authentification and receiving content title selections. The remote server 18 may then dispense the selected content title via the agent process hosted on the local server 2 as discussed above.

The remote server 18 may operated by a provider of data services to a subscriber enterprise where the service provider furnishes or installs the local server 2 at a premises of the subscriber enterprise. The service provider may provide the local server 2 with computer instructions pre-loaded onto the HDD 56 for providing the Intranet system including instructions for generating the home page 500 at the GUI screens of the client computer workstations 20. Upon installation of the local server 2 at the premises of the subscriber enterprise, a user may order data services from the remote server 18 through a network browser by selecting an icon in the home page 500.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method of providing media content to a subscriber utilizing a client computer, the method comprising:
    receiving a request, at a local server, from the subscriber utilizing the client computer, for retrieval of media content;
    transmitting the request for the media content to a remote server, the request including encoded data identifying the subscriber; and
    receiving a digitized content file from the remote server at the local server, the digitized content file including a combination of the media content requested by the subscriber and the encoded data identifying the subscriber that was transmitted with the request for the media content.

2. The method of claim 1, further including an agent process on the local server transmitting the digitized content file to the subscriber at the user computing device, the digitized content file including the media content requested by the subscriber and the encoded data identifying the subscriber.

3. The method of claim 1, further including storing the digitized content file on a dedicated partition of a disk drive of the client computer, the digitized content file including the media content requested by the subscriber and the encoded data identifying the subscriber, the dedicated partition of the disk drive being inaccessible by the subscriber utilizing the client computer.

4. The method of claim 3, further including removing the digitized content file from the dedicated partition of the disk drive once a subscription period has expired.

5. The method of claim 1, wherein the encoded data identifying the subscriber includes a name of the subscriber.

6. The method of claim 1, wherein the encoded data identifying the subscriber includes an account number of the subscriber.

7. The method of claim 1, wherein the media content is in a video format and the encoded data identifying the subscriber includes a watermark that is inserted into video frames of the media content.

8. A machine-readable medium having recorded thereon instructions, such that when said instructions are executed, said instructions cause a local server to:
- receive a request from a subscriber utilizing a client computer, at the local server, for retrieval of media content;
- transmit the request for the media content to a remote server, the request including encoded data identifying the subscriber; and
- receive a digitized content file from the remote server at the local server, the digitized content file including a combination of the media content requested by the subscriber and the encoded data identifying the subscriber that was transmitted with the request for the media content.

9. The machine-readable medium of claim 8, including instructions, which when executed, cause the local server to transmit the digitized content file to the subscriber at the client computer, the digitized content file including the media content requested by the subscriber and the encoded data identifying the subscriber.

10. The machine-readable medium of claim 8, including instructions, which when executed, cause the local server to store the digitized content file on a dedicated partition of a disk drive of the client computer, the digitized content file including the media content requested by the subscriber and the encoded data identifying the subscriber and the dedicated partition of the disk drive being inaccessible by the subscriber utilizing the client computer.

11. The machine-readable medium of claim 10, including instructions, which when executed, cause the local server to remove the digitized content file from the dedication partition of the disk drive once a subscription period has expired.

12. The machine-readable medium of claim 8, wherein the encoded data identifying the subscriber includes a name of the subscriber.

13. The machine-readable medium of claim 8, wherein the encoded data identifying the subscriber includes an account number of the subscriber.

14. The machine-readable medium of claim 8, wherein the media content is in a video format and the encoded data identifying the subscriber includes a watermark that is inserted into video frames of the media content.

15. A method of providing media content to a subscriber utilizing a client computer, the method comprising:
- receiving a request from the subscriber, at a remote server, for retrieval of the media content, wherein the request includes data identifying the subscriber;
- retrieving the media content, the media content being in a compressed format;
- decompressing the media content to create a decompressed media content file; and
- inserting a watermark into the decompressed media content file, the watermark including the data identifying the subscriber, to create a combined media content file including the watermark and the decompressed media file.

16. The method of claim 15, further including compressing the combined media content file and transmitting the compressed combined media content file to a local server and then to the client computer.

* * * * *